Figure 1:
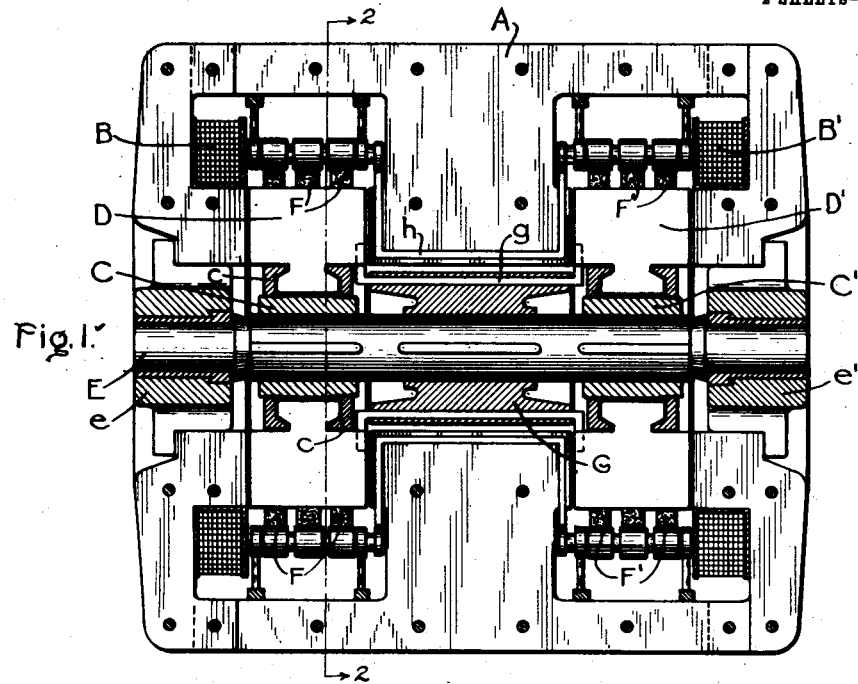

No. 832,742. PATENTED OCT. 9, 1906.
J. E. NOEGGERATH.
UNIPOLAR ALTERNATING CURRENT MACHINE.
APPLICATION FILED MAR. 17, 1905.

2 SHEETS—SHEET 1.

Witnesses.

Inventor:
Jakob E. Noeggerath,
by Albert G. Davis
Att'y.

No. 832,742. PATENTED OCT. 9, 1906.
J. E. NOEGGERATH.
UNIPOLAR ALTERNATING CURRENT MACHINE.
APPLICATION FILED MAR. 17, 1905.
2 SHEETS—SHEET 2.
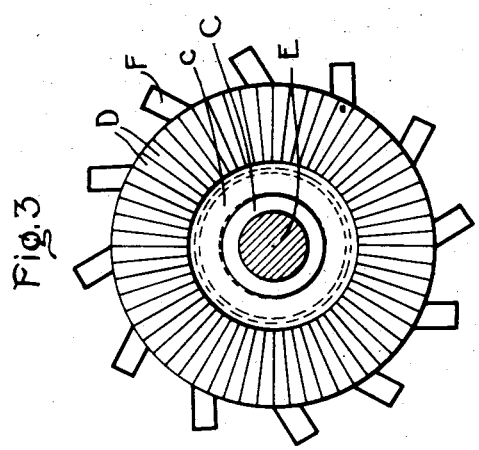
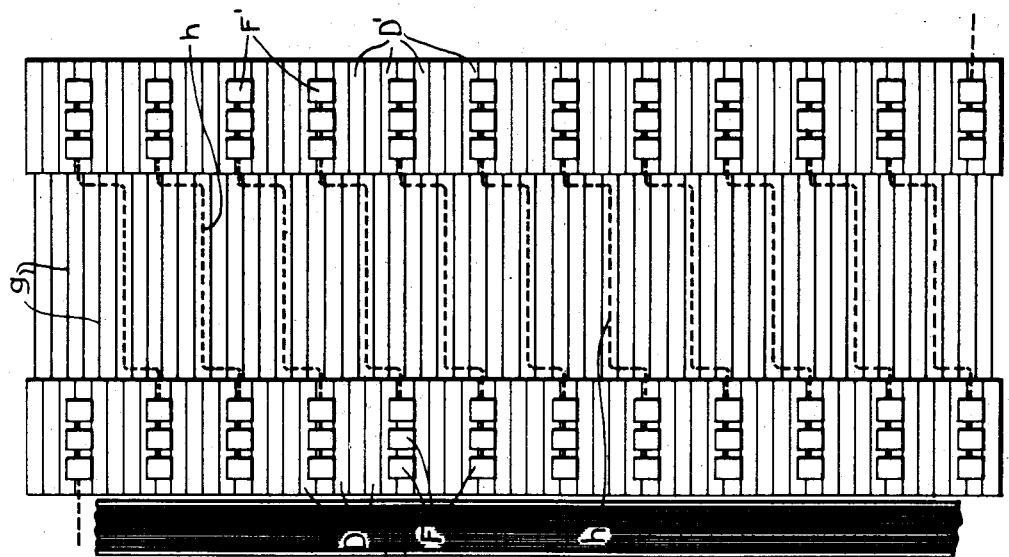
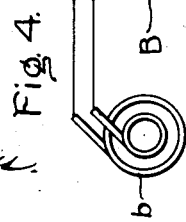
Witnesses.
Inventor:
Jakob E. Noeggerath
by Albert G. Davis
Att'y

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

UNIPOLAR ALTERNATING-CURRENT MACHINE.

No. 832,742.  Specification of Letters Patent.  Patented Oct. 9, 1906.

Application filed March 17, 1906. Serial No. 250,573.

*To all whom it may concern:*

Be it known that I, JAKOB E. NOEGGERATH, a citizen of the United States, residing at Schenectady, county of Schenectady, State of New York, have invented certain new and useful Improvements in Unipolar Alternating-Current Machines, of which the following is a specification.

My invention relates to dynamo-electric machines for operation on alternating currents.

I have discovered that a machine of the unipolar type may be adapted by laminating its field structure and properly proportioning and arranging the several parts for efficient commercial operation on alternating current, either as generator or motor. In a generator thus arranged the speed at which the armature is driven has no effect upon the frequency of the currents produced, but only upon the voltage. The frequency is determined absolutely by the frequency of alternation of the field flux. Such a generator possesses advantages for operation at ordinary frequencies as compared with machines of the usual construction, since there is no danger of its falling out of synchronism, as it has no synchronous speed, but will operate at any speed, delivering currents of a frequency determined by the frequency of the current supplied to its field-coil. Such a machine is particularly advantageous for use with steam-turbines, since it renders it possible to obtain the usual commercial frequencies with as high a speed as desired. Furthermore, such a generator possesses the great advantage of rendering it possible to obtain commercially alternating currents of exceedingly low frequencies, such as three or four cycles, frequencies which have been commercially unattainable with machines of the usual type. Similarly as a motor the machine may operate on a current of any frequency and at any speed. As a motor the machine will start under load and will operate sparklessly for all loads and speeds.

In its broadest aspect I claim as my invention an alternating-current dynamo-electric machine comprising a unipolar field structure provided with a field-winding adapted for connection to a source of alternating current and a plurality of armature-conductors arranged to be traversed by the flux of said unipolar field and relatively movable thereto, the field structure being laminated in planes parallel to the armature-shaft.

My invention further comprises a number of structural features which assist in producing an efficient machine of the general type described above. These features will appear from the following specification and accompanying drawings and will be more specifically pointed out in the appended claims.

Figure 2:
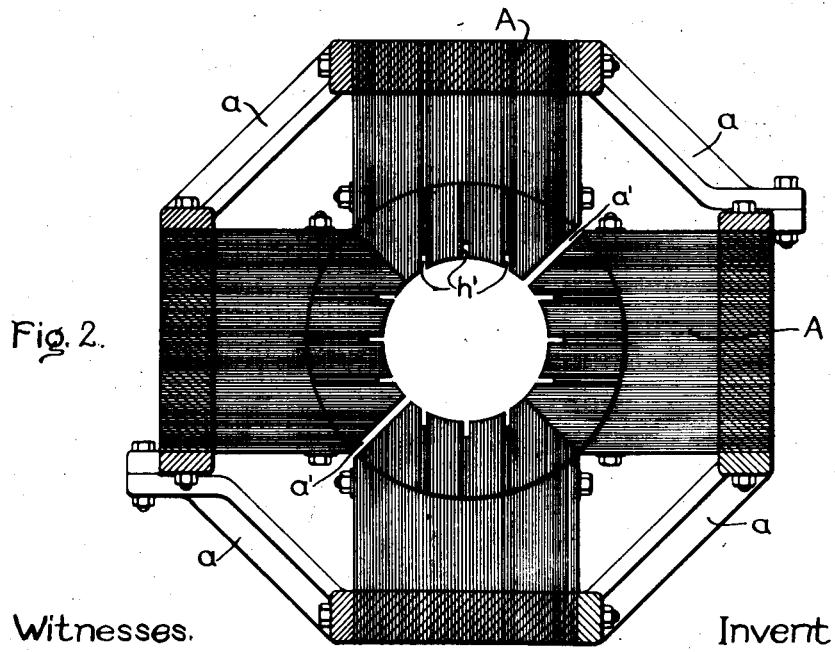

In the drawings, Figure 1 shows a cross-sectional side elevation of a machine arranged in accordance with my invention. Fig. 2 shows a cross-section of the field structure on line 2 2 of Fig. 1. Fig. 3 shows an end elevation of one of the armatures, and Fig. 4 shows a diagrammatic development of the armatures and brush connections.

In the drawings, A represents the field structure, which is composed of laminations of magnetic material. In order that the field structure may be readily assembled, I form it of a plurality of sections, as shown in Fig. 2, each section consisting of a body of parallel laminations arranged in planes parallel with the shaft. These sections at their inner extremities are in contact with or near to each other, so as to form a substantially continuous magnetic ring. This ring may be broken at one or two places, as indicated at $a'$ in Fig. 2, in order to prevent the circulation of eddy-currents, as will be hereinafter explained. The several sections, of which there are shown four in Fig. 2, extend radially outward, diverging from each other, and are held together by the frame-pieces $a\ a$. The spaces between the sections afford convenient access to the collecting-brushes, as will hereinafter appear.

B B' in Fig. 1 represent the field or magnetizing coils.

E represents the armature-shaft, which is mounted in bearings $e\ e'$ at opposite ends of the machine. These bearings are made of non-magnetic material, so as to prevent leakage of the field flux through the shaft. Secured to the shaft near its opposite ends are the two armature hubs or bodies C C'. The hub C is provided with two clamping-rings $c$, between which are clamped the armature-conductors D, which are suitably insulated from the clamping-rings. The construction of the armature which I have shown resembles somewhat that of the commutator on a direct-current machine. This construction is shown in end elevation in Fig. 3. The armature-conductors D are sector-shaped and radially arranged in a solid mass and are made of magnetic material, such as iron or steel. With the laminated field-body A the armature-conductors form a nearly-closed magnetic circuit for the flux of the field-coil B. A similar path through the armature-conductors D' is formed at the opposite end of the machine for the flux of the field-coil B'. Since the air-gaps between the armature-conductors D and the field structure A are radial, they may be made much shorter than in a machine as ordinarily constructed, since it is unnecessary to provide for wear of the bearings, which in the usual type of machine if the air-gap were made too small would soon bring the armature in contact with the field structure.

The flux passes through both sets of armatures D and D' in an axial direction, so that the electromotive forces induced by rotation are in a radial direction. If the field-coils B and B' are properly connected, the electromotive force induced in the conductors D may be radially inward at the instant that the electromotive force induced in the conductors D' is radially outward. Consequently it is possible to place a conductor D in series with the conductor D' by connecting their inner ends. Such connections are shown at $g$ in Fig. 1. These conductors may be supported in a member G, keyed to the shaft. In order to reduce magnetic leakage from the field structure A to the shaft, this member may be made of non-magnetic material.

F and F' represent brushes bearing on the outer ends of the conductors D and D', respectively, all collecting devices intermediate the conductors and the brushes being dispensed with in the arrangement shown. Since the conductors D and D' are connected in series, as has been heretofore explained, an electromotive force exists between the brush F and the brush F', bearing on the corresponding conductors equal to the electromotive force of two conductors. The terminal voltage of the machine may be made as high as desired by connecting brushes at opposite ends of the machine in series. This connection is preferably made by means of conductors $h$, which are placed in holes or slots at or near the inner periphery of the field structure A. The conductors $h$ and $g$ serve mutually to neutralize the other's self-induction. The inner periphery of structure A is shown slotted in Fig. 2 at $h'$ in order to receive these return-conductors.

Fig. 4 shows a development of the two armatures and their connections. The field-coils are indicated at B and in this case are shown connected to an auxiliary exciter $b$, supplying alternating current. The two sets of armature-conductors are represented at D and D', and F and F' represent the brushes bearing on the periphery of the conductors. The connections $g$, permanently connecting opposite conductors, are shown in full lines, while the return-conductors $h$, supported by the frame, are shown in dotted lines. Twelve sets of brushes are shown on each armature. Since the brushes are all connected in series, a terminal voltage equal to twenty-four times the induced voltage of one conductor is obtained. The terminal voltage may be varied as desired by varying the relative connections of the brushes.

For the sake of simplicity each return-conductor in Fig. 4 is shown connecting a brush to the next to the opposite brush on the other armature. This arrangement obviously produces such a distribution of potential on each armature that the maximum voltage of the armature exists between two adjacent brushes. This would be undesirable in practice, and accordingly the connections would ordinarily be arranged so that the maximum potential would exist between opposite or nearly opposite points on each armature. Such a change in the connections will be obvious to those skilled in the art.

A machine of the character described may be self-excited or separately excited, and if self-excited may be shunt, series, or compound. When self-excited, it of course requires, like other asynchronous generators, a synchronous machine connected to the same system to determine the frequency. While only a portion of the armature-conductors are at any instant in circuit, the current density for this reason may be high, so that the same output per unit of weight may be obtained as if all the armature-conductors were all the time in circuit.

It will be seen that since the armature-conductors are all revolving in a uniform field the electromotive forces induced in all the conductors will be equal. Consequently there can be no short-circuit currents under the brushes at any time, and sparkless operation is therefore secured. Moreover, the variations in current in adjacent conductors in passing under a brush are such that the self-induction is mutally neutralized.

Since the field flux is parallel to the shaft, it is essential in order to prevent eddy-currents that the electric continuity of all conductors surrounding the shaft should be interrupted. Thus, for instance, if collector-rings are employed between the conductors and brushes the electrical continuity of the rings must be interrupted. It is for this reason that the continuity of the ring forming the unipolar field is interrupted by air-gaps $a'$, as shown in Fig. 2. Since the revolving disk armatures are formed of separate conductors, eddy-currents are prevented by suitable insulation placed between adjacent conductors, as in the construction of an ordinary commutator.

It will be obvious that my invention comprises a number of features which while I prefer to use them together may with advantage be used separately and which I desire to claim whether used together or not. For instance, although I believe a disk armature of the form shown and described is particularly adapted for efficient operation in a machine of this type it will be understood that in its broadest aspects my invention is not limited to this particular form of armature. Accordingly I do not desire to limit myself to the particular construction and arrangement of parts here shown, but aim in the appended claims to cover all modifications which are within the scope of my invention.

What I claim as new, and desire to secure by Letters Patent of the United States, is—

1. An alternating-current dynamo-electric machine, comprising a field structure arranged to produce a unipolar field, a field-winding adapted to be connected to a source of alternating current, and a plurality of armature-conductors arranged to be traversed by the flux of said unipolar field and relatively movable thereto, said field structure being laminated in planes parallel with the armature-shaft.

2. In a field structure for dynamo-electric machines, a plurality of radially-arranged sections, each composed of parallel laminations, said sections having their inner ends in close proximity to each other so as to form a unipolar field.

3. In a field structure for dynamo-electric machines, a plurality of radially-arranged sections, each composed of parallel laminations, said sections having their inner ends in close proximity to each other and forming a substantially continuous ring of laminated magnetic material.

4. In a field structure for dynamo-electric machines, a plurality of radially-arranged sections, each composed of parallel laminations, said sections having their inner ends in close proximity to each other and forming a substantially continuous ring of laminated magnetic material, and a magnetizing-coil concentric with said ring.

5. In an alternating-current dynamo-electric machine, a field structure comprising a plurality of radially-arranged sections, each composed of parallel laminations, said sections having their inner ends in close proximity to each other so as to form a unipolar field, and a magnetizing-coil concentric with the shaft of the machine connected to a source of alternating current.

6. In an alternating-current dynamo-electric machine, a unipolar field structure formed of laminations arranged in planes parallel with the shaft, and a field-winding connected to a source of alternating current.

7. In an alternating-current dynamo-electric machine, a unipolar field structure formed of laminations arranged in planes parallel with the shaft, and a field-coil concentric with the shaft, and connected to a source of alternating current.

8. In a dynamo-electric machine, a revolving armature comprising a plurality of radially-arranged conductors of magnetic material, and a field structure laminated in planes parallel with the armature-shaft and adapted to produce a unipolar flux threading said conductors in an axial direction.

9. In a dynamo-electric machine, a revolving armature comprising a plurality of radially-arranged conductors of magnetic material, a field structure laminated in planes parallel with the armature-shaft and adapted to produce a unipolar flux threading said conductors in an axial direction, and collecting-brushes bearing on the outer ends of said conductors.

10. In a dynamo-electric machine, two sets of radially-arranged conductors of magnetic material carried by the shaft, a field structure arranged to produce two unipolar-field fluxes threading said two sets of conductors respectively in an axial direction and connections between the inner ends of conductors of opposite sets.

11. In a dynamo-electric machine, two sets of radially-arranged conductors of magnetic material carried by the shaft, a field structure arranged to produce two unipolar-field fluxes threading said two sets of conductors respectively in an axial direction, connections between the inner ends of conductors of opposite sets, and two sets of brushes bearing on the outer ends of the two sets of conductors respectively.

12. In a dynamo-electric machine, two sets of radially-arranged conductors of magnetic material carried by the shaft, a field structure arranged to produce two unipolar-field fluxes threading said two sets of conductors respectively in an axial direction, connections between the inner ends of conductors of opposite sets, two sets of brushes bearing on the outer ends of the two sets of conductors respectively, and connections between brushes of opposite sets, said connections being carried by the field structure adjacent to the first-mentioned connections.

13. In a dynamo-electric machine, a revolving armature comprising a plurality of radially-arranged sector-shaped conductors of magnetic material bound together in a solid mass, and a field structure laminated in planes parallel with the armature-shaft and adapted to produce a unipolar flux threading said conductors in an axial direction.

14. In a dynamo-electric machine, a revolving armature comprising a plurality of radially-arranged conductors, a field structure composed of laminations arranged in planes parallel with the shaft and adapted to produce a unipolar flux threading said conductors in an axial direction, and a field-winding connected to an alternating-current source.

15. In a dynamo-electric machine, two sets of radially-arranged conductors carried by the shaft, a field structure arranged to produce two unipolar-field fluxes threading said two sets of conductors respectively in an axial direction, connections between the inner ends of conductors of opposite sets, two sets of brushes bearing on the outer ends of the two sets of conductors respectively, and connections between brushes of opposite sets, said connections being carried by the field structure adjacent to the first-mentioned connections.

16. In a dynamo-electric machine, two sets of radially-arranged armature-conductors carried by the shaft, a laminated field structure adapted to produce two unipolar fields threading said conductors respectively, a field-winding connected to a source of alternating current, and conductors connecting the inner ends of armature-conductors of opposite sets.

17. In a dynamo-electric machine, two sets of radially-arranged armature-conductors carried by the shaft, a laminated field structure adapted to produce two unipolar fields threading said conductors respectively, a field-winding connected to a source of alternating current, conductors connecting the inner ends of armature-conductors of opposite sets, two sets of collecting-brushes in electrical contact with the outer ends of said armature-conductors respectively, and conductors carried by the field structure adjacent to said connecting-conductors and connecting-brushes of opposite sets.

18. A dynamo-electric machine comprising field structure and armature both of magnetic material laminated in planes parallel with the armature-shaft and said field structure being arranged to produce a unipolar field, and a field-winding adapted to be connected to a source of alternating current.

19. In a dynamo-electric machine, an armature comprising a plurality of radially-arranged conductors, brushes bearing directly on said conductors at or near their outer ends, and a field structure laminated in planes parallel with the armature-shaft and adapted to produce a unipolar flux threading said conductors in an axial direction.

In witness whereof I have hereunto set my hand this 15th day of March, 1905.

JAKOB E. NOEGGERATH.

Witnesses:
BENJAMIN B. HULL,
HELEN ORFORD.